UNITED STATES PATENT OFFICE.

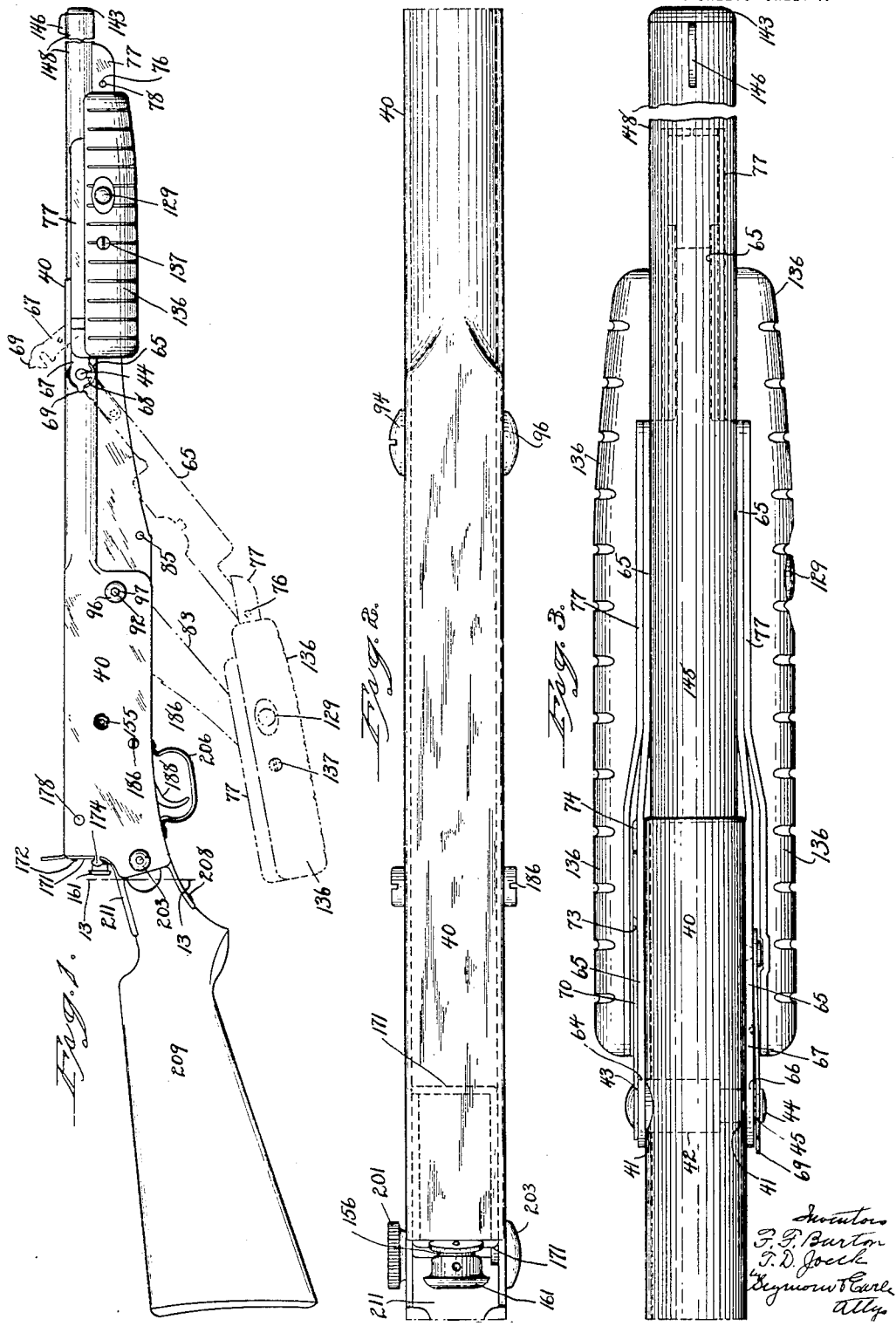

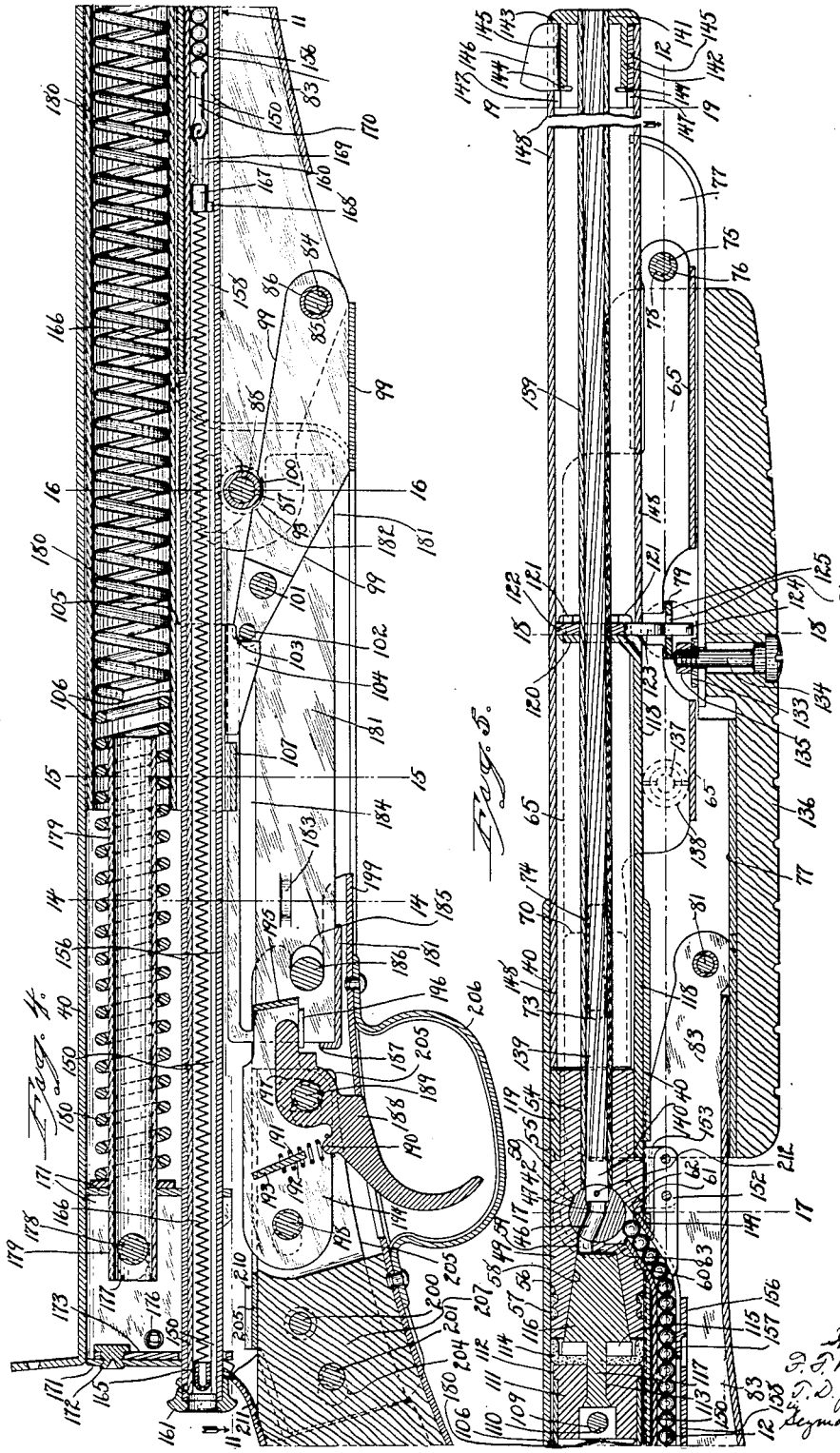

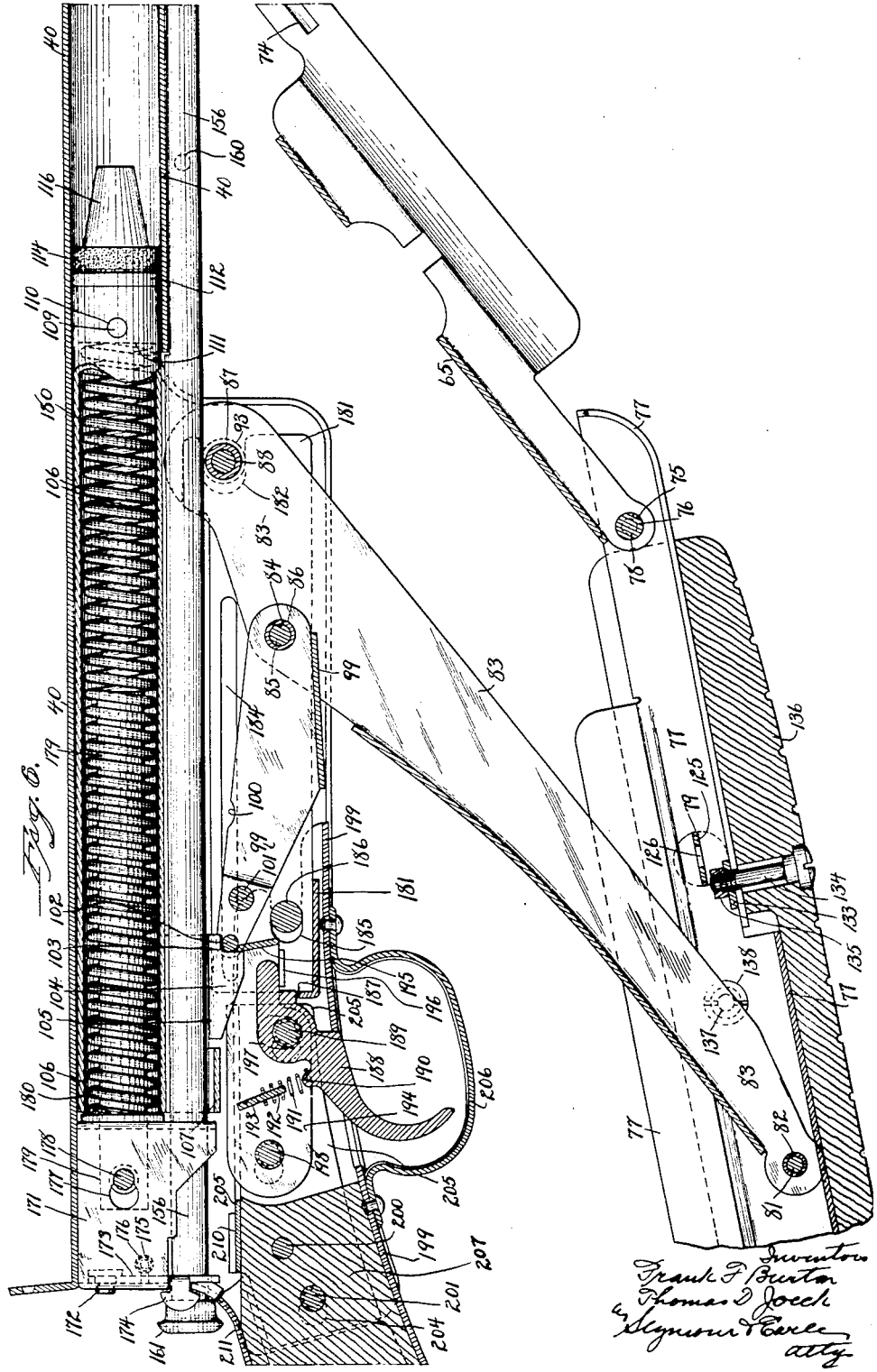

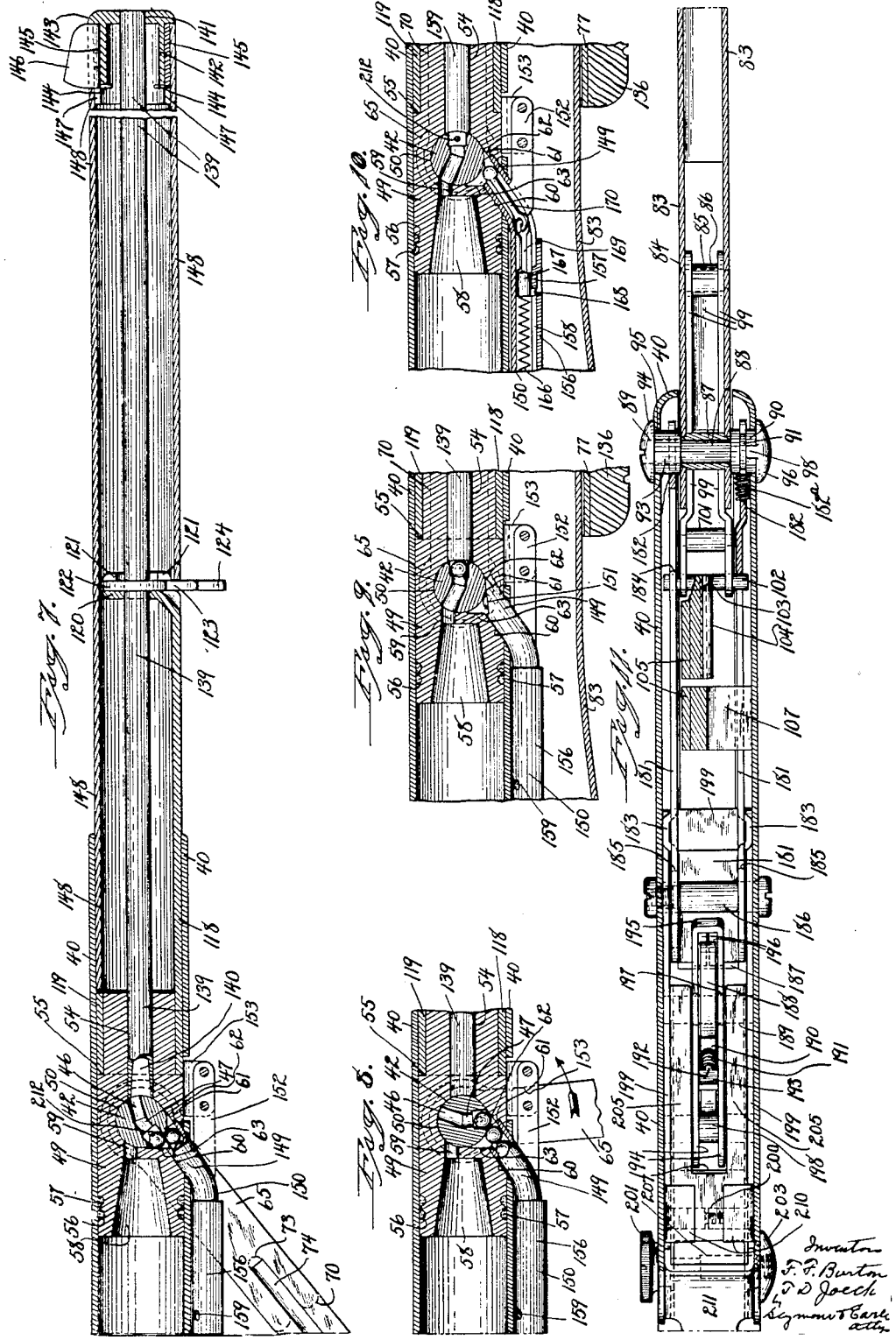

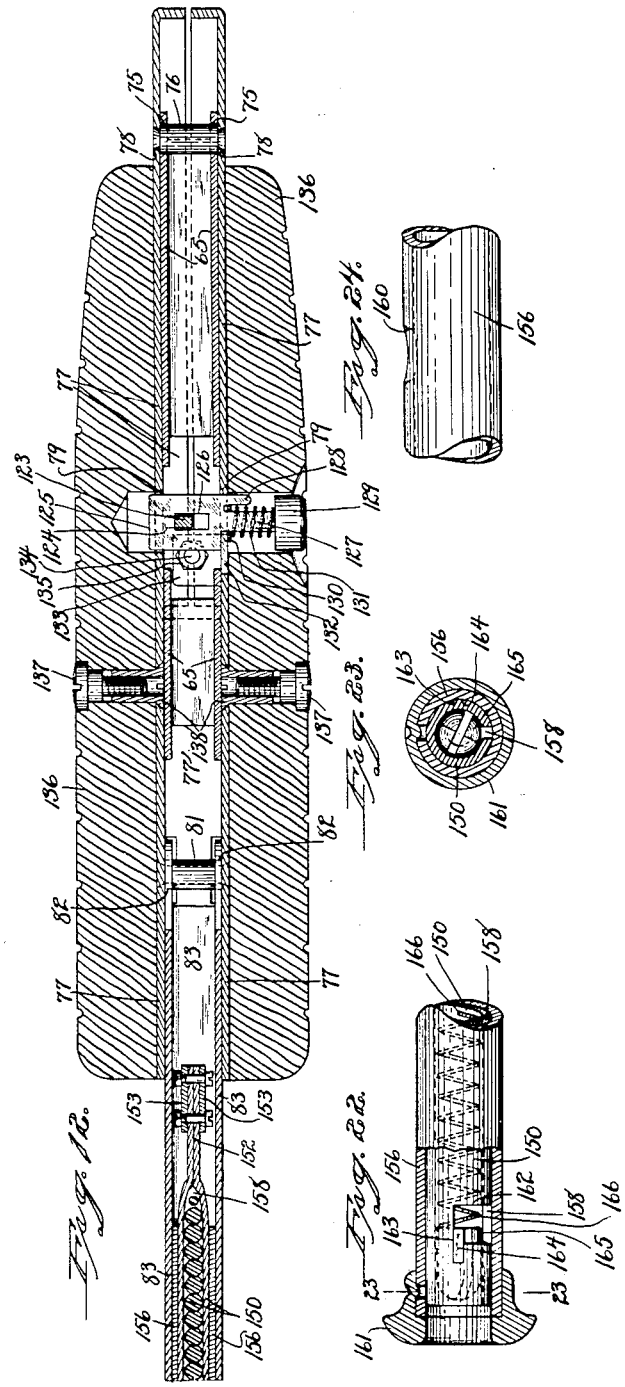

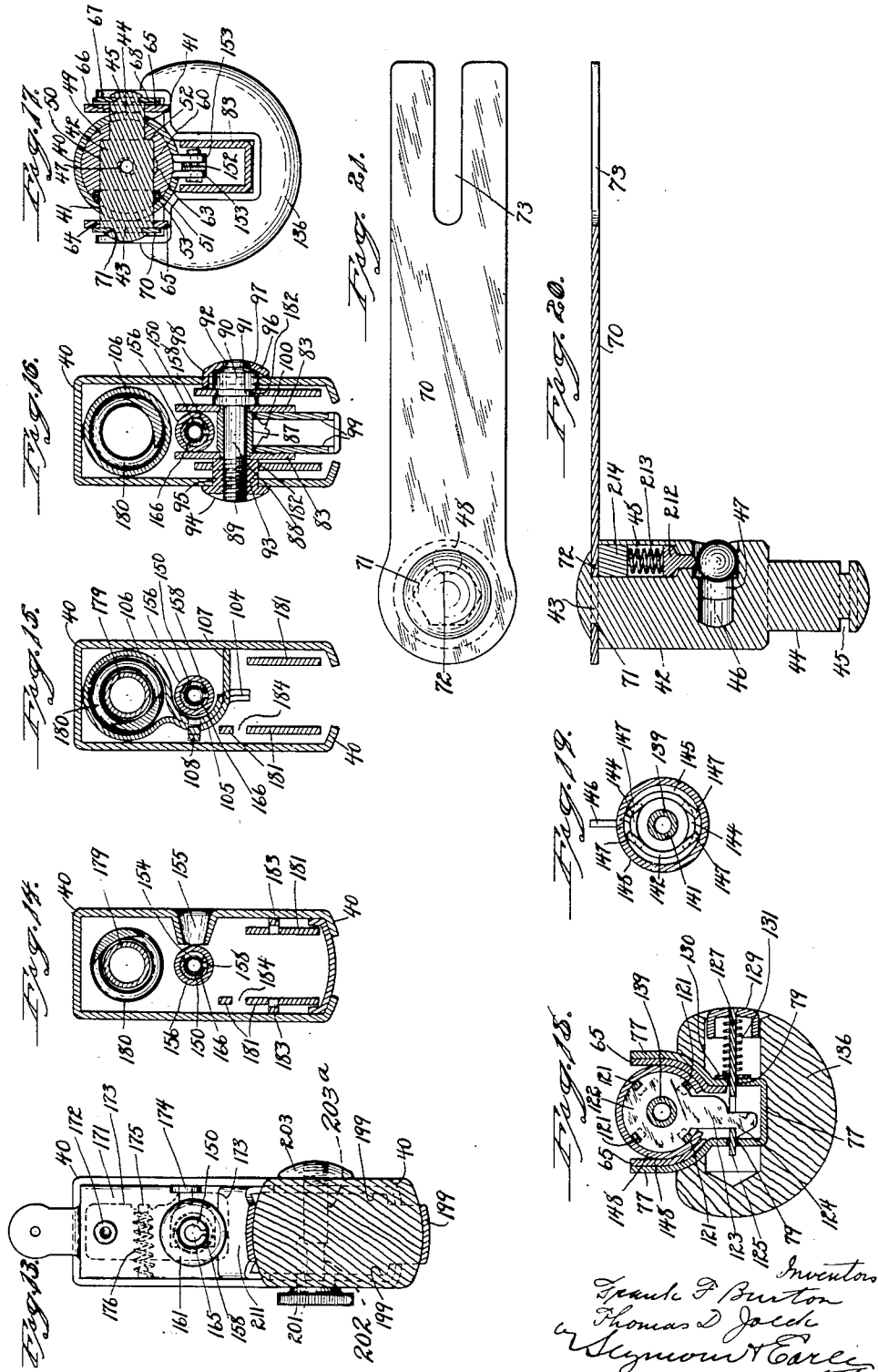

FRANK F. BURTON, OF MOUNT CARMEL, AND THOMAS D. JOECK, OF NEW HAVEN, CONNECTICUT, ASSIGNORS TO WINCHESTER REPEATING ARMS COMPANY, OF NEW HAVEN, CONNECTICUT, A CORPORATION.

AIR-GUN.

1,396,404. Specification of Letters Patent. Patented Nov. 8, 1921.

Application filed February 17, 1921. Serial No. 445,691.

*To all whom it may concern:*

Be it known that we, FRANK F. BURTON and THOMAS D. JOECK, citizens of the United States, residing, respectively, at Mount Carmel and at New Haven, both in the county of New Haven and State of Connecticut, have invented a new and useful Improvement in Air-Guns; and we do hereby declare the following, when taken in connection with the accompanying drawings and the characters of reference marked thereon, to be a full, clear, and exact description of the same, and which said drawings constitute part of this application, and represent, in—

Figure 1, a broken view in side elevation of the gun shown with the action closed, in full lines, and open in dotted lines, and with the pellet carrier spring in its locked and unlocked positions in full lines and in dotted lines respectively.

Fig. 2, an enlarged plan view of the receiver with the front portion thereof cut away.

Fig. 3, a corresponding broken view, in continuation of Fig. 2, of the front portion of the receiver, the barrel and the action-handle.

Fig. 4, a view in central vertical longitudinal section, partly in elevation, corresponding to Fig. 2.

Fig. 5, a similar view in continuation of Fig. 4, corresponding to Fig. 3.

Fig. 6, a view corresponding to Fig. 4, showing the action open.

Fig. 7, a view in continuation of Fig. 6, corresponding to Fig. 5, showing the action open.

Fig. 8, a view corresponding to Fig. 7, showing the action half open and the barrel broken away.

Fig. 9, a view corresponding to Fig. 8, showing the action closed and a pellet in position in the carrier.

Fig. 10, a view corresponding to Fig. 9, showing the gun empty of pellets and the magazine follower and link in position in the curve of the magazine.

Fig. 11, a view in horizontal section on the line 11—11 of Fig. 4.

Fig. 12, a view in horizontal section on the line 12—12 of Fig. 5.

Fig. 13, a view in vertical transverse section on the line 13—13 of Fig. 1.

Fig. 14, a corresponding view on the line 14—14 of Fig. 4.

Fig. 15, a corresponding view on the line 15—15 of Fig. 4.

Fig. 16, a corresponding view on the line 16—16 of Fig. 4.

Fig. 17, a corresponding view on the line 17—17 of Fig. 5.

Fig. 18, a corresponding view on the line 18—18 of Fig. 5.

Fig. 19, a corresponding view on the line 19—19 of Fig. 5.

Fig. 20, a detached enlarged view in horizontal section of the pellet-carrier and the operating lever and pellet retaining plunger thereof, all assembled, with a pellet in position therein.

Fig. 21, a similar view thereof in left-hand side elevation.

Fig. 22, an enlarged detached broken view, partly in vertical central section, of the rear ends of the magazine cover and magazine.

Fig. 23, a similar view in transverse vertical section on the line 23—23 of Fig. 22, showing the magazine spring abutment in rear elevation.

Fig. 24, a similar view of a portion of the magazine cover, showing the detent hole therein.

Our invention relates to an improvement in spring operated air-guns, the object being to produce a simple and durable air-gun of improved efficiency and accuracy.

With these ends in view our invention consists in an air-gun characterized by having a combined loading and cocking system comprising a closed chain of four links; whereof the receiver forms one link, to which are pivotally attached a loading lever and a cocking lever, forming two other links, the outer ends of which are pivotally connected to the ends of an operating handle forming the fourth link, which is thus constrained to an approximate parallelism to the barrel throughout the path of the handle.

Our improved air-gun is further characterized by having an air compression piston provided with a forwardly extending frusto-conical buffer seating into a corresponding recess at the forward end of the compression chamber.

Our improved air-gun is further characterized by having a positive feed magazine located in the receiver and loaded through the side thereof whereby the dangers of loading at the muzzle as in forms commonly heretofore used are avoided.

Our invention is further characterized by certain details of construction and combinations of parts as will be hereinafter described and pointed out in the claims.

In carrying out our invention, as herein shown, we use a sheet metal receiver 40 having a trough-shaped rear portion of rectangular cross-section open at the bottom and at the rear end, and having a tubular front portion of circular cross-section, the front portion being provided near its forward extremity with a circular hole 41, Fig. 17, extending through both sides thereof in which is mounted a rotatable cylindrical pellet carrier 42 having cylindrical extensions 43 and 44 on its left hand and right hand ends, respectively. The right hand extension 44 is provided with a circumferential groove 45. The pellet carrier 42 is also provided with two radial bores 46 and 47, meeting at a slight angle at its center, and with an eccentric transverse counterbored hole 48. The bores 46 and 47 are of less diameter than the pellets to be used in the gun and the bore 47 is counterbored at its outer end for the reception of a pellet as hereinafter described.

In the forward end of the receiver is located a cylindrical plunger stop 49 having a transverse hole 50 for the reception of the pellet carrier 42. The hole 50 is doubly counterbored forming two annular shoulders 51 and 52. The right hand end of the pellet-carrier seats against the shoulder 52 and is thereby accurately positioned laterally in the gun. This seat is accurately fitted to furnish an air-tight contact. The left hand counterbore which forms the shoulder 51 receives an oil soaked leather pellet-carrier seal 53 serving to render the contact between the pellet-carrier and the plunger stop air tight. The stop 49 has an axial hole 54 extending forward from the hole 50 for the reception of the true barrel as hereinafter described. The counterbored radial hole 47 of the pellet carrier is accurately alined with the hole 54 when the pellet carrier is in its normal position. The forward portion of the stop is of less diameter than the body thereof forming a shoulder 55 for coaction with a plunger stop abutment as hereinafter described. The rear portion of the stop 49 is provided with an annular groove 56 having a raised annular central rib. The groove 56 receives an oil soaked leather strip 57 which acts as a seal between the stop 49 and the receiver 40. The stop 49 is further provided at its rear end with an axial frusto-conical recess 58 extending nearly to the hole 50. From the bottom of the recess 58 a small hole 59 lying above the axis of the stop connects the recess 58 with the hole 50 in such a way as to communicate with the radial bore 46 of the pellet-carrier when the latter is in its normal position. From the bottom of the hole 50 a counterbored hole 60 having a shoulder 61 extends downwardly and rearwardly through the bottom of the stop for the reception of the forward end of a tubular magazine which abuts against the shoulder 61 as hereinafter described so as to form a continuous passage from the magazine to the pellet-carrier. The lower side of the extreme upper end of the hole 60 forms a pellet camming surface 62. The rear upper edge of the hole 60 is cut away to form another pellet camming surface 63. The surfaces 62 and 63 act successively to seat the pellets in the carrier as hereinafter described.

As described above the pellet-carrier is positioned in the gun against movement to the right by its abutment against the shoulder 52 of the stop 49. The body of the carrier extends through the left hand hole 41 of the receiver and passes through a corresponding hole 64 in the rear end of the left hand wall of a trough-shaped, sheet metal loading lever 65. The extension 44 of the pellet-carrier passes through the hole 50 of the plunger stop and through the right hand hole 41 of the receiver and through a corresponding hole 66 in the rear end of the right hand wall of the loading lever 65. Upon the outside of the loading lever in front of the hole 66 is pivoted a flat pellet-carrier retaining spring 67. The rear end of the spring 67 is formed with a downwardly opening notch 68 and a rearwardly extending operating lug 69. The spring 67 is curved outwardly throughout its length. When the parts are assembled the groove 45 is engaged by the walls of the notch 68 and the carrier is drawn firmly to the right by the tension of the spring 67 thus perfecting the seal between the pellet-carrier body and the positioning shoulder 52 of the plunger stop 49. The spring 67 is provided with an inwardly struck retaining boss 67$^a$ entering a corresponding hole in the wall of the lever 65 to hold the spring yieldingly in place.

Upon the outer end of the left hand extension 43 of the carrier 42 is mounted a pellet-carrier operating lever 70. The lever 70 is provided at its rear end with a hexagonal hole 71 having one of its sides formed in a reëntrant arc 72. The extension 43 is grooved by the counterbored hole 48 and this groove receives the projection 72 when the extension 43 is entered into the hole 71. The extreme end of the extension is then riveted over the end of the lever 70 whereby the extension is deformed to fill the irregular hexagonal hole 71 and the lever 70 is positively locked to the carrier 42 for the operation thereof. The forward end of the lever 70 is provided with a central longitudinal notch 73 coacting with a longitudinal tongue 74 struck outwardly from the side wall of the loading lever 65. The lever 65 is formed also in its right hand side wall with a corresponding stiffening rib.

The loading lever 65 is provided at its forward end with pivot holes 75 for the reception of a shouldered pivot 76 upon which the lever 65 turns. The pivot 76 is riveted at both ends into the front ends of the side walls of a trough-shaped sheet metal action handle frame 77, the upper part of which is of sufficient width to receive the loading lever 65 within it, and the lower part of which is of sufficient width to house the forward portion of the cocking lever (to be hereinafter described) when the gun is closed. The floor of the frame 77 is raised in the forward part over approximately half the length of the frame relatively to the rear portion thereof and rises at the front end in a curve to form a front wall. The front portion of this floor is longitudinally slotted to permit the insertion of the pivot 76 into the pivot holes 78 by springing the side walls of the frame apart.

At about the middle of the frame the side walls are pierced by slots 79 for the reception of the action lock mechanism as hereinafter described. In the side walls of the frame near the rear end thereof are located holes 80 for the reception of a bushed rivet 81 which also passes through holes 82 located at the forward end of a trough-shaped sheet metal cocking lever 83.

The cocking lever 83 is provided at approximately a quarter of its length from its rear end with holes 84 passing through its side walls and receiving a pivot 85 upon which is mounted a bushing 86 which spaces the walls of the lever 83 apart. In the side walls of the lever 83 at the rear end thereof is transversely mounted a bushing 87. A cocking lever pivot 88 passes through the bushing 87 which turns thereon.

The pivot 88 has a threaded end 89; and upon the other end of the pivot 88 is a cylindrical head 90 having a circumferential groove 91 and having an axially arranged rivet end 92. A nut 93 having an overhanging head 94 is mounted upon the threaded end 89 of the pivot and passes through a hole 95 in the left hand wall of the receiver 40 against which its overhanging head 94 bears. A cup-like sheet metal cap 96 having an octagonal tapering central hole 97 and a transversely projecting lug 98 upon its periphery, is mounted upon the rivet end 92 of the pivot 88. The head 90 of the pivot 88 is mounted in a corresponding hole in the right hand wall of the receiver 40, against which the cap 96 bears.

A notch is provided in the said wall to receive the lug 98 of the cap 96 to prevent the rotation thereof. The rivet end 92 is riveted down upon the cap 96 in such a way as to deform it to fit the octagonal hole 97 through which it passes, thus locking the cap 96 and the pivot 88 against relative rotation. Since the action handle frame is pivoted at its respective ends to the cocking lever and the loading lever which in turn are pivoted to the receiver, the action handle is constrained to maintain itself approximately parallel to the receiver in all of its motion by virtue of the substantially parallelogrammatic linkage of the four parts.

A trough-shaped sheet metal cocking pawl 99 is pivotally mounted within the cocking lever 83 upon the spacing bushing 86. The upper edges of the side walls of the pawl 99 are notched as at 100 to provide clearance for the cocking lever pivot bushing 87 when the gun is closed. The rearward ends of the side walls, which extend considerably beyond the floor of the pawl, are held in spaced relationship by means of a transverse tie pin 101 having shouldered rivet ends mounted in the side walls of the pawl near the rear end thereof. In the rear ends of the side walls is mounted a plunger operating pin 102.

When the gun has been discharged, Figs. 4 and 5, the pin 102 is just out of engagement with the rounded upper portion 103 of the front face of a depending lug 104 formed along the bottom edges of a transversely semicircularly curved offset 105 depending from the under side of the rear end of a tubular sheet metal plunger body 160. The offset 105 is formed on its right hand edge at the bottom with a laterally extending guide lug 107 and in the middle of its curved left hand surface with a laterally outwardly struck guide rib 108, the lug 107 and the rib 108 bearing against the inner surfaces of the side walls of the receiver, within which, the plunger body is located, to prevent rotation of the plunger body. Near the front end of the plunger body is mounted a pin 109 which in turn passes through a hole 110, located in the rear portion of a cylindrical plunger head 111 provided with an annular enlargement 112 at its forward end against the rear face of which the front end of the plunger body abuts. There is an axially arranged counterbored and countersunk hole 113 extending through the head 111. Immediately in front of the plunger head and in contact therewith is positioned centrally perforated cup-shaped washer 114 made of any suitable material such as soft leather. Immediately in front of the cup washer 114 and in contact therewith is located a centrally perforated washer 115. The cup washer 114 fits tightly within the cylindrical front portion of the receiver 40 and is supported by the plunger head 111 which has an easy sliding fit in the receiver. Immediately in front of the washer 115 is located a frusto-conical plunger extension 116 having an integral cylindrical stem 117 extending axially rearwardly therefrom through the washers 115 and 114 respectively, and into the hole 113 of the plunger head 111 where the end of the stem is expanded to fill the countersunk portion of the hole 113. When the gun is discharged the extension 116 stops against the walls of the frusto-conical recess 58 in the plunger stop 49.

The plunger stop 49 as hereinbefore described has a shoulder 55 formed by a circumferential rabbet at its forward end for coaction with a plunger stop abutment 118 whose rear end is formed with a short integral tubular collar 119 which fits over the forward end of the plunger stop 49 and abuts against the shoulder 55. The abutment is located with its rear portion within the front end of the receiver 40 and is rigidly attached thereto by welding, soldering, or any other suitable means. The abutment is formed of sheet metal, its main portion being a transversely curved strip extending forwardly for some distance beyond the forward end of the receiver 40. At the forward end of the abutment 118 the same is upwardly turned and centrally perforated to form an upstanding annular lug 120 having four forwardly projecting lugs 121 which are received by corresponding slots formed in the periphery of the circular head of the action lock hook 122 which also is centrally perforated. The hook 122 lies flatwise against the lug 120 and the ends of the lugs 121 are bent inward to clamp the hook firmly in place.

From the body of the hook 122 depends an irregular lug 123 of which the lower end is provided with a hook-shaped catch 124 on the left while on the right it is cut away to provide clearance for the action lock slide 125 which is mounted in the slots 79, hereinbefore described, in the action handle frame 77. The action lock slide is a flat piece of sheet metal having a rectangular head with a central rectangular perforation 126 through which the action lock hook passes when the action is closed and the left hand one of the shorter edges of which is then engaged by the catch 124. The opposite external short side of the slide 125 is provided centrally with a long stem 127 and at its forward corner with a short stem 128. The stem 127 is narrowed at its outer end to form a rivet end upon which is mounted a cup-shaped push button 129. A washer 130 is mounted loosely upon the stem 127 and a helical spring 131 is interposed between the washer 130 and the inner surface of the button 129 encircling the stem 127. The washer 130 bears against the outer surface of the right hand wall of the action handle frame 77. The left hand end of the action lock slide 125 has a sliding fit in the left hand slot 79 of the action handle frame 77 and is guided thereby. The right hand slot 79 extends rearwardly beyond the rear edge of the slide 125 when the latter is in position and a square slot extends downwardly from the rear end of the slot 79 for the reception of an action lock slide retaining plate 132 having at its lower edge a turned in portion 133 which rests flatly against the upper surface of the floor of the frame 77. The plate 132 fills the square slot and furnishes an abutment for the right hand portion of the rear edge of the slide 125. The lower plate 133 extends rearwardly beyond the plate 132 forming a shoulder which bears against the inner surface of the side wall of the frame 77 immediately to the rear of the square slot. The portion 133 is perforated for the reception of a bolt 134 which is mounted vertically in the action handle (hereinafter described), passes through the floor of the frame 77 and enters a nut 135 thus locking the action handle, the action handle frame and the retaining plate 133 together. The slide 125 is guided on the right hand side by the contact of the stem 127 with the plate 132 and by the contact of the short stem 128 with the front end of the right hand hole 79. The bolt 134 is mounted in a countersunk hole bored through the floor of an action handle 136 which is a substantially cylindrical piece of wood flattened on the upper side and having its forward half tapered slightly and its outer surface circumferentially grooved to furnish a good grip. Along the entire length of the handle it is slotted from the upper surface downwardly in an irregular manner adapted to receive the action handle frame 77 to which it is attached by means of the bolt 134 already described and by two screws 137 passing through threaded bushings 138 mounted in corresponding lateral counterbored holes in the side walls of the handle. These bushings 138 also pass through countersunk holes in the side walls of the action handle frame 77 and have enlarged heads to fit the countersunk portions of the holes. The handle 136 is also provided with a lateral passage in its right hand wall and a recess in its left hand wall to provide passage and clearance for the action lock mechanism. The outer end of this passage is countersunk to permit the button 129 to be positioned below the surface of handle as a protection against accidental operation.

As before described, the plunger stop 49 is provided with an axially arranged bore 54 for the reception of a true barrel 139 which is inserted therein and secured to the stop 49 by soldering, brazing or other suitable means as for example by forming screw threads in the bore 54 and on the rear end of the barrel. The bore of the barrel is rifled throughout its length except for a conically tapering chamber 140 at its rear end. The barrel is supported at a point approximately one third of its length from its rear end by passing through the previously described centrally perforated upstanding lug 120 of the plunger stop abutment 118. It also passes through the centrally perforated head of the action lock hook 122. It is supported at its front end by being inserted into a bore 141 in the vertical front wall of the false barrel plug 142 which is a hollow cylinder closed at the forward end and open at the rear. The front wall extends beyond the periphery of the cylinder forming a rearwardly facing abutment shoulder 143 and having its front edge rounded off to furnish an ornamental finish. Its side wall is intersected at diametrically opposite points of the rear edge thereof by a pair of T-shaped slots 144. Over the body of the plug 142 and abutting against the shoulder 143 is fitted a sheet metal ring 145 bearing an upstanding lug 146 which functions as a front sight. The two lugs 147 formed in each side of the plug 142 are forced outwardly behind the rear edge of the ring 145 which is of just sufficient width to lie between the shoulder 143 and the lugs 147 and is thus locked in place upon the plug 142. The plug and the ring are fitted into the front end of a false barrel 148 which is slotted to receive the front sight lug 146 and abuts against the shoulder 143. The false barrel 148 is fastened to the ring 145 by welding, brazing or any other suitable means. The false barrel extends rearwardly into the forward end of the receiver and is welded or brazed, or otherwise suitably attached thereto but does not contact with the forward face of the upstanding plunger stop abutment collar 119 so that none of the shock of the plunger against the plunger stop can be transmitted to the false barrel, which is also provided with a slot to receive the strip-like body portion of the plunger stop abutment 118, the forward wall of this slot abutting against the front face of the action lock hook 122.

As before described, the plunger stop 49 is provided with a downwardly rearwardly oriented hole 60 for the reception of the forwardly upwardly turned end 149 of a horizontal tubular magazine 150, the end 149 being cut away as at 151, (Fig. 9) to provide clearance for the passage of a pellet from the magazine to the pellet carrier 42. From the under surface of the upturned end 149 of the magazine a fin 152 extends forward and is received between and bolted to a pair of lugs 153 depending from the lower surface of the cylindrical front portion of the receiver while the end 149 of the magazine rises through a hole in the receiver located behind the lugs 153. The body of the magazine extends rearwardly along the bottom of the cylindrical front portion of the receiver and outside of it, and within the rear portion between the walls thereof and through the trough of the curved portion of the extension 105 of the plunger 106 and is provided at about one third of its length from its rear end with a circular loading opening 154 in its right hand side which is positioned to correspond to a loading opening 155 formed in the bottom of a substantially conical depression struck inward in the right hand side wall of the receiver in such a way that the edges of the opening 155 are near enough to the edges of the opening 154 to prevent a pellet from passing between them and yet far enough apart just to permit the passage of a tubular magazine cover 156, which fits over and slides upon the magazine and is provided in the upper surface of its forward end with a slot which provides clearance for the bottom face of the tubular front portion of the receiver. Near the front end of its bottom surface the cover 156 is provided with a tongue 157 struck inwardly and projecting through a longitudinal slot 158 in the bottom of the magazine for the operation of the magazine follower as hereinafter described. A short distance behind the tongue 157 is an outwardly struck boss 159 which acts as a positive stop to prevent the magazine cover from being withdrawn from the gun, by contacting with the forward wall of the main spring abutment through which the cover passes and by which it is supported, in turn supporting the rear end of the magazine as hereinafter described. A short distance to the rear of the boss 159 is located a hole 160 in the right hand side wall which acts as a yielding stop by coaction with the magazine cover lock as hereinafter described. The hole 160 is formed by punching a round hole in the flat sheet from which the cover is made before the latter is rolled into a tube. By the rolling the edges of the hole are distorted as shown forming the equivalent of a sloping-walled notch in the exterior surface of the cover without any corresponding interior projection.

Upon the rear end of the magazine cover 156 is positioned a grip button 161 having a central perforation to receive the rear end of the magazine cover and fastened thereto by having a portion of its material forced inwardly into holes in the walls of the cover, as shown in Fig. 22.

The rear end of the slot 158 in the magazine 150 is intersected by a transverse slot 162 which at its inner end is intersected by a short rearwardly extending slot 163 for the reception and retention of a depending lug 164 formed on the cylindrical body of a magazine spring abutment 165 having an open front end and a hemispherically closed rear end. A helical magazine spring 166 abuts with its rear end against the forward end of the abutment 165 and extends forwardly through the bore of the magazine 150 and abuts at its forward end against the rear face of the cylindrical body of a sheet metal magazine follower link 167 which is formed with a depending guide lug 168 which rides in the slot 158 of the magazine 150 and engages the tongue 157 of the magazine cover for retraction thereby. The body of the follower link is provided at its forward end with a forwardly projecting stem 169 terminating in an integral ring which is interlinked to form a universal joint with a corresponding ring formed integral with the rear end of the stem-like body of a sheet metal magazine follower 170 bearing at its forward end an integral struck-up spherical knob, this construction permitting the knob to follow the pellets along the magazine and around the curve of its upturned front end 149.

In the upper rear corner of the receiver 40 is located a substantially rectangularly parallelopipedal boxlike main spring abutment 171 whose front and rear walls are perforated near their bottom ends for the reception, support and guidance of the magazine cover 156 as hereinbefore described. The rear wall of the abutment is perforated by a countersunk hole for the reception of a rivet 172 upon which is pivoted the magazine cover lock 173 which is a flat piece of sheet metal lying against the rear wall of the box 171 and having an outwardly turned shouldered operating lug 174 extending through a slot cut in the rear and right hand side walls of the box at the junction thereof. About midway of its length on the right hand edge, the lock is provided with a reflexly bent tongue 175 for the reception of a helical operating spring 176 whose other end bears against the left hand side wall of the box 171 and is held in place by an inserted tongue struck inwardly therefrom.

In the lower end of the lock 173 is a D-shaped aperture through which passes the magazine cover 156 and whose flat edge enters the locking slot therein under the tension of the spring 176 to lock the same in place.

The box 171 is provided on each side with a circular hole intersected at its forward edge by a smaller circular hole the two forming a keyhole shaped opening 177 for the reception of an assembling pin 178 of such a diameter as to enter the larger portion of the hole 177. The pin is furnished near each end with an annular groove which will permit the walls of the smaller portion of the hole 177 to enter therein thus retaining the pin against lateral displacement. The pin 178 passes through holes in the rear end of a tubular cylindrical main spring guide 179 which extends forwardly therefrom through an aperture in the front wall of the main spring abutment and projects for some distance into the space inclosed by the rear portion of the receiver.

The guide 179 is surrounded by the rear end of the main spring 180 between which and the front wall of the abutment 171 is interposed a washer surrounding the guide. The spring 180 extends forwardly through the tubular plunger 106 and abuts against the rear face of the plunger head 111.

Between the lower parts of the side walls of the rear portion of the receiver toward the front part thereof is located a safety lock slide 181 of two parallel substantially rectangular plates joined at their bottom edges for a short space from their rear ends by an integral transverse plate. The forward edges of the side plates are notched as at 182 for the entrance and clearance of the pivot 85 the edges of the right hand notch sliding in the groove 91 thereof for the guidance of the front end of the safety lock, which is further assured by the sliding contact against the receiver wall of a rib formed in the left hand plate. The rear end of the safety lock is guided by a pair of similar ribs 183 formed in the rear portion of the side plates and similarly having sliding contact with the inner surfaces of the side walls of the receiver.

The right hand notch 182 is intersected at its rear edge by a smaller notch for the reception of a small helical spring 182ª, Fig. 11, whose rear end abuts against the bottom of the notch 182 and whose forward end abuts against the head 90 of the cocking lever pivot 88. A longitudinal slot 184 is cut in the left hand plate to receive the cocking pawl pin 102 which slides freely therein throughout the major portion of its travel and is guided thereby during its motion. The right hand plate is cut away at the top to clear the loading opening 155 of the receiver. An elongated hole 185 is formed in each of the side plates of the safety lock near its rear end to define and limit the motion of the safety lock by the engagement of the front and rear edges of the said hole with the cylindrical body of a guide screw 186 which is mounted in the side walls of the receiver 40 and is held in place by a nut.

The transverse connecting plate at the rear end of the safety lock extends a short distance rearwardly beyond the side plates and is turned up against the rear edges of the side plates to form a trigger engaging surface 187 which, when the safety lock is in its rearward position contacts with a shoulder formed on the under side of the forwardly extending sear-actuating arm of the trigger 188. The trigger is pivotally mounted on a pin 189 mounted in the stock tang as hereinafter described. Below the pin 189 is the customary finger lever of the trigger having on its upper rear surface an upwardly projecting lug 190 which engages the lower end of a helical combined trigger and sear spring 191, Fig. 6, the upper end of which engages a guide stem 192 dependent from the lower edge of the sear spacing plate 193 which is located transversely between the side walls of the duplex sheet metal sear 194 and is rigidly attached thereto.

The two side walls of the sear are spaced apart by the plate 193 and are spaced apart and held together by the integral front wall 195, and are turned in at the front of the bottom edge to form the trigger engaging surface 196 which coacts with the trigger for operations of the sear thereby. The upper portion of the inner surface of the front wall 195 is engaged by the lower corner of the lug 104 of the plunger 106, as shown in Fig. 6, when the gun is cocked. The sear is provided near the forward end of its lower portion with an elongated hole 197 through which the trigger pin 189 passes and by contacting with the edges thereof limits the motion of the sear. The sear is pivotally mounted at its rear end on a pin 198 in the upper central portions of the side walls of a trough shaped sheet metal stock-tang 199 in which is also mounted the trigger pin 189. Near the rear end of the tang is positioned a transverse assembling screw 200 and also a take-down screw 201 formed with a knurled slotted head having on its inner side a stop shoulder and a cylindrical bearing for coaction with a keyhole slot 202 (sheet 6, Fig. 13) in the rear edge of the left hand wall of the receiver 40. The rear end of the right hand wall of the receiver is pierced by an octagonal countersunk hole 203ª (Sheet 6, Fig. 13) for the reception of a stem located on the under side of an internally threaded nut 203 having a broadly overhanging head. The said stem is riveted down to fill the said octagonal hole and countersink, thus retaining the nut firmly in place against rotation and furnishing sufficient material for the reception of the threaded end of the take down screw. The screw is also provided with an annular recess receiving the edges of a key-hole slot 204 in the left hand wall of an inverted-trough-shaped sheet metal sear guide 205 located within the stock-tang 199 and inclosing the sear. The take-down screw also passes through an elongated hole in the right hand wall of the guide. The guide is further provided with two pairs of key-hole slots for the reception of the trigger pin and sear pin respectively, these being formed near their ends with annular grooves for the reception of the forward edges of the key-holes. The horizontal top plate of the sear guide is longitudinaly slotted as shown in Fig. 11 for the reception and guidance of the sear.

The front edges of the side walls of the stock-tang 199 are intersected by longitudinal slots which receive the safety lock guide screw 186 when the gun is assembled. The floor of the stock-tang 199 is pierced to receive rivets for the attachment of the trigger guard 206. The tang is also slotted for the passage of the trigger finger lever, the front end of this slot acting as a stop to limit the forward motion of the finger lever. The floor of the tang is extended rearwardly beyond the side walls and is attached by a screw 208 to the forwardly projecting tenon 207 of the stock 209. The tenon is further held in the stock-tang by means of lugs 210 formed on the top of the latter and bent over to embrace the tenon. The tenon is also provided with transverse holes for the passage of the take-down screw 201 and the assembling screw 200. Upon the upper side of the tenon is mounted a sheet metal stock plate 211, which is ornamental only. The lower edges of the walls of the receiver are turned in, as shown in Fig. 14, to support the floor of the stock tang.

To fill the magazine the magazine cover lock 173 is released by laterally inward pressure on the operating lug 174 whereby the straight edge of the D shaped hole in the lock is withdrawn from the locking slot of the magazine cover 156. The cover is then drawn rearwardly by means of the grip button 161 until the stop 159 strikes the front face of the forward wall of the main spring abutment 171, thus opening a passage through the holes 155 and 154 in the receiver and magazine respectively. The cover is yieldingly held in this position by the coaction of the lock with the hole 160 of the cover. This operation also retracts the magazine follower 170 and its attached link 167 to lie behind the loading opening, by the coaction of the retracting lug 157 of the cover with the lug 168 of the follower link through the slot 158 of the magazine. Pellets are then poured into the magazine through the loading holes, whereupon the magazine cover is again pushed forward, covering the hole 154, until the lock 173 snaps into the locking slot of the cover, locking the latter in place. The magazine spring 166 is compressed by the presence of the pellets between the pellet-carrier 42 and the knob of the follower.

The loading and cocking of the gun are performed simultaneously by the operation of the action handle 136. Lateral inward pressure upon the button 129 of the action lock 125 against the tension of the spring 130

131 moves the lock to the left freeing the edge of the hole 126 from the catch 124 of the action lock hook 122. The action handle may then be swung downwardly and rearwardly by a direct rearward pull thereon in a long arc as shown in Fig. 1, the levers 83 and 65 maintaining it substantially parallel to itself throughout this motion. The lever 65 rotates the pellet-carrier from the normal position shown in Fig. 5 to the position shown in Fig. 7.

Just before arriving at this position the foremost pellet in the magazine is entered into the counterbored outer end of the radial bore 47 of the carrier. During the completion of the rearward movement of the lever 65 the pellet camming surface 63 seats the pellet part way home in the bore 47 and during the return stroke of the lever 65 the pellet is pushed completely into position in the bore 47 by the pellet camming surface 62, and upon completion of the return stroke is alined with the conical chamber 140 of the barrel 139, as shown in Figs. 9 and 10.

In the meantime the cocking pawl 99 is pushed rearwardly by the motion of the cocking lever 83. The pin 102 engages the lug 104 of the plunger 106 carrying the same rearwardly and compressing the mainspring 180. The sloping lower face of the lug 104 rides down the upper edge of the forward wall 195 of the sear 194 which on rising again under the tension of the spring 191 comes up in front of the lower corner of the lug 104 and on the return stroke of the lever 83 engages the said lug and holds the plunger back against the tension of the main spring 180 which was compressed by the plunger head 111 against the main spring abutment 171. The spring 180 is meanwhile prevented from lateral buckling by the guide 179.

As the cocking pawl moves rearwardly, the pin 102, which holds the safety lock 181 forward against the tension of its spring 182ᵃ (Sheet 4, Fig. 11), releases the safety lock which moves rearward under the tension of the said spring until stopped by the contact of the forward edge of the hole 185 with the screw 186. In this position the trigger stop 187 is engaged with the under surface of the upper part of the trigger as shown in Fig. 6 thus preventing the forward portion of the trigger from being pulled down to release the sear from the plunger. Near the end of the return stroke of the mechanism, the pin 102 engages the forward edge of the slot 184 and draws the safety lock forward against the tension of its spring unlocking the trigger. Thus it is impossible to pull the trigger and discharge the gun with the action open. During the return motion of the cocking pawl, its rear end is guided by the pin 102 sliding in the slot 184. As the operating handle is returned to the normal position, the sloping face of the catch 124 cams the action handle lock 125 to the left against the tension of the spring 131 until the lock rises above the catch and snaps into place above it.

When the finger lever of the trigger is drawn rearwardly, the sear operating arm thereof draws the forward end of the sear down against the tension of the spring 191 releasing its forward end 195 from engagement with the plunger 106 which moves forward under the tension of the main spring 180. The sear pivots on the pin 198 at its rear end and its forward end is guided between the edges of the longitudinal slot in the top plate of the sear guide 205.

The cylindrical front portion of the receiver which houses the plunger acts as the air-compression chamber of the gun and the plunger head with its associated parts acts as the piston therefor. When the plunger is released by the sear, it moves forward under the tension of the main spring, compressing the air in front of the plunger head between the same and the plunger stop, within the walls of the receiver. To render this compression efficient, the plunger head carries the soft cup-shaped washer which is expanded by the pressure of the air to seal the contact of the plunger head with the bore of the receiver. The joint between the plunger stop and the receiver is made tight by the yielding seal 57. And the joints between the plunger stop and the pellet-carrier are made tight as before described. There is thus no escape for the contained air except by way of the passage through the plunger stop, the bores of the pellet-carrier and the barrel. The pellet is frictionally held at first in the counterbore of the bore 47 by means of a pellet retaining plunger 212, Fig. 20 which slides in the bore 48 of the pellet-carrier under the tension of a spring 213 which abuts against a plug 214 held in place by the pellet-carrier lever 70. When the air pressure behind the pellet becomes sufficient to start it from its seat, it jumps into and seals the outer end of the conical chamber of the barrel and is momentarily checked, while the lands are cutting grooves in it, long enough for the air pressure behind it to be built up to an optimum value by advancing plunger, when it moves forward and is expelled from the barrel.

In guns of this class it is essential that the space available for the expansion of the compressed air be as small as possible in order to raise the pressure behind the pellet as high as may be before the pellet leaves the barrel. It is essential also that the flow paths of the compressed air be as little curved as may be and that the final volume of the compressed air be small, in order to produce a high initial compression. These ends are attained in the present invention by the peculiar shape of the plunger head extension and its coaction with the corresponding recess of the plunger stop, and by the small volume and direct path of the passages from the compression chamber to the barrel chamber.

The shock of the collision of the plunger head against the plunger stop is cushioned by the thick, yielding washer 115.

The structure disclosed renders it easily possible to remove the main spring and plunger in order to apply a new plunger head and extension when the leather parts thereof are worn out.

In order to do this the gun is taken down by unscrewing the take-down screw 201 from its nut 203 whereupon the stock, together with the stock tang and its contained parts, may be drawn rearwardly away from the receiver and its parts. By pushing forward upon the main spring abutment against the tension of the main spring the walls of the smaller forward portions of the keyhole slots in the side walls of the abutment are freed from the grooves of the main spring abutment pin 178 which may then be driven laterally out of the abutment and the receiver leaving the abutment free to be pushed out rearwardly from the receiver, by the main spring, drawing with it the magazine cover. The main spring, which when free protrudes beyond the rear end of the receiver may now be withdrawn leaving the plunger and its attached head, etc., free to be withdrawn likewise. By knocking out the pin 109 the plunger head and associated parts may be removed from the plunger for replacement in case the cup washer becomes worn out.

At this stage the interior magazine parts may be removed by pushing forward on the magazine spring abutment 165 until the lug 164 thereof slides out of the longitudinal slot 163 of the magazine into the lateral slot 162 thereof, whereupon it may be rotated to lie in the slot 155 and under the tension of the magazine spring the abutment will slide out of the rear end of the magazine. The spring 166 may now be withdrawn leaving the magazine cover free to be entirely withdrawn from the gun bringing the magazine follower and link with it. The main rear passages of the gun, namely the compression chamber and the magazine are now clear and open as far as the pellet carrier.

The pellet carrier may be dismounted by pushing upward on the lug 69 of the spring 67 which releases the edges of the notch thereof from the annular groove 45 of the pellet carrier 42, whereupon the pellet-carrier may be driven laterally to the left out of the gun. All of the longitudinal passages of the gun are then clear and open for inspection and cleaning.

The stock tang and its contained mechanism, namely the sear and trigger, may also be very simply disassembled upon the removal of the assembling screw 200 therefrom. The elongation of the pin slots in the sear guide permits it to be driven forward disengaging the forward edges of the said slots from the annular grooves of the take-down screw, the sear pin and the trigger pin respectively. The said screw and pins may then be removed, and the sear guide, sear, trigger, trigger and sear spring and stock may be separated, the stock carrying with it the stock plate 211.

By the construction disclosed certain important advantages are attained. The loading and cocking system of four links in a substantially parallelogrammatic arrangement achieves a forearm action in which the operating handle moves along the natural path of the operating hand, when the gun is operated at the shoulder; and also gives a long sweep to the operating handle, thereby providing for a great mechanical advantage for the handle over the plunger and spring, which makes for immensely enhanced ease of operation.

The greatly increased velocity of pellets and efficiency of transmission of power from the main spring to the pellet are due to the extremely high initial compression of the air attained. This rests on the fact that the pellet is held back by the conical chamber against the rising pressure of the air behind it until the optimum pressure is reached and also on the fact that the final volume of the air is minimized by the use of the frusto-conical plunger extension and the corresponding recess of the plunger stop. A further advantage due to the design and combination of the plunger extension, the plunger stop, the pellet-carrier and the barrel is that there are no abrupt bends or corners in the path of the stream of compressed air thereby minimizing frictional losses of energy.

A further advantage of great importance is the fact that the magazine is filled, and may be emptied through the side of the receiver near the rear end of the weapon, instead of near or at the muzzle as in repeating air guns of the prior art; and the dangers consequent thereon are avoided.

The combination of the spring pellet feed of the magazine with the counterbored pellet seat of the carrier and the camming surfaces of the plunger stop insures the certain delivery of a single unmutilated pellet to the barrel at each operation of the action.

The entire path of the pellets through the gun comprising the magazine and the barrel may be cleared for inspection and cleaning without the use of any special tools and without deformation of any parts such as rivets or lugs. The power storage mechanism may be similarly removed. Also the pellet-carrier may be dismounted whether or not there is a pellet therein, regardless as to whether the gun is cocked or not.

The taking of the shock of the plunger ultimately upon the plunger stop abutment, which is preferably welded to the front end of the receiver makes it possible to use a false barrel of very light material and thus improves the balance of the gun as well as relieves the barrel and false barrel from shock and strain.

Any important part or unit of a gun constructed in accordance with this disclosure can be dismounted in case of accidental injury thereto and replaced by an interchangeable part without the use of any special tools or the deformation of any part; excepting the receiver, plunger stop abutment, false barrel, false barrel plug and front sight which are permanently united into a single unitary framework.

The trough-like construction of the cocking lever and the sliding safety lock and the semi-circular cross-section of the operating lug of the plunger permit the use of a magazine inclosed within and protected by the receiver and cocking lever, lying under the power storage mechanism and filled near the rear of the gun through the side of the receiver.

The conical depression which leads to the loading aperture in the receiver enables the magazine to be filled with greatly increased ease and speed and with greatly lessened possibility of spilling the pellets.

We claim:—

1. In a gun, a receiver, a loading lever and a cocking lever pivoted to the said receiver, and an action handle pivoted to the said levers for the operation thereof.

2. In a gun a substantially parallelogrammatic closed operating system of four links, comprising a receiver, a loading lever, an operating handle and a cocking lever.

3. In an air-gun, a barrel, a positive-feed pellet-magazine, a rotatable pellet-carrier for conveying the pellets from the magazine to the barrel, means for operating the said pellet-carrier, an air-compression mechanism, means for operating the same independent of the said means for operating the pellet-carrier; and means for the simultaneous operation of the pellet-carrier operating-means and the air-compression operating-means.

4. In an air-gun, a receiver, a positive-feed pellet-magazine, a rotatable pellet-carrier, a loading-lever applied to the said pellet-carrier for the operation thereof, a power-storage mechanism, a cocking-lever mounted on the receiver for the operation of the said power-storage mechanism, and a common operating-handle connecting the outer ends of the said levers for the simultaneous operation thereof.

5. In an air-gun, a receiver, a barrel, a positive-feed pellet-magazine, means for successively feeding pellets from the magazine to the barrel, a lever for operating the said means, a power-storage mechanism, a lever for operating the same, and a common handle connecting the outer ends of the said levers for the simultaneous operation thereof.

6. In an air-gun, a receiver, a barrel, an air-compression chamber, a plunger therein; a power-storage mechanism for the operation of the plunger, a positive-feed pellet-magazine mounted in the receiver, a pellet-carrier interposed between the contiguous ends of the said magazine, compression-chamber and barrel, a lever for the operation of the said mechanism, a lever for the operation of the said pellet-carrier, and a handle pivotally connecting the outer ends of the said levers for the simultaneous operation thereof.

7. In an air-gun, a receiver, a barrel, a positive-feed pellet-magazine, an air-compression mechanism, a rotatable pellet-carrier interposed between the contiguous ends of the said barrel, magazine and mechanism, a lever applied to the said pellet-carrier for the operation thereof, and means connecting the said air-compression mechanism and the said lever for the simultaneous operation thereof.

8. In an air-gun, a receiver, a power storage mechanism located therein, a loading lever and a cocking lever pivotally mounted on the said receiver, a common operating handle pivotally mounted on the said levers and a pawl pivotally mounted on the said cocking lever for the operation of the said power storage mechanism.

9. In an air-gun, a receiver; an air-compression chamber therein; a plunger in the said chamber; a plunger operating spring; a plunger operating pawl; a trigger mechanism for the retention and release of the said plunger; a cocking lever pivoted to the said receiver and to the said pawl for the operation thereof; a magazine and a barrel mounted in the said receiver; a plunger stop block mounted in the said receiver at the end of the said compression chamber and receiving the ends of the said magazine and barrel; a rotatable pellet-carrier mounted in the said block and interposed between the said chamber, magazine and barrel; a loading lever mounted on the said carrier for the operation thereof; and a common operating handle mounted on the said cocking and loading levers for the simultaneous operation thereof.

10. In an air-gun, a receiver, a loading lever pivoted thereto, and an action handle pivoted to the said lever for the operation thereof and having a trough-shaped metal frame for the reception of the said lever when the gun is closed.

11. In an air-gun, a receiver, a loading lever and a cocking lever mounted thereon, and a common action handle mounted on the said levers for the operation thereof having a trough-shaped metal frame for the reception of the said levers when the gun is closed.

12. In an air-gun, a receiver, a false barrel mounted therein, a loading lever mounted on the said receiver, an action handle pivotally mounted on the said lever and having a trough-shaped metal frame for the reception of the said loading lever and the said false barrel when the gun is closed.

13. In an air-gun, a receiver, a false-barrel mounted therein, a loading mechanism, a cocking mechanism, and an operating-handle connected with the said mechanisms for the simultaneous operation thereof and positioned under the barrel and movable toward and away therefrom, so as to constitute a forearm for being grasped by the forward hand of the shooter.

14. In an air-gun, a receiver, a loading mechanism, a cocking mechanism, and a false-barrel mounted therein, an operating-handle located under the false-barrel in position to serve as a forearm, whereby the gun may be grasped by the forward hand of the shooter, means connecting the respective ends of the said forearm with the loading and cocking mechanisms, and locking-means connecting the handle and false-barrel for normally holding the handle in position against the barrel.

15. In an air-gun, a receiver having a power storage mechanism, a plunger, and a plunger stop positioned within the said receiver; a plunger stop abutment rigidly secured within the said receiver and a false barrel also rigidly secured within the said receiver; a depending hook mounted upon the said plunger stop abutment and extending through the said false barrel; an action handle associated with the said barrel and having motion away from and toward the same for the operation of the gun; and a spring operated sliding catch mounted within the said handle for coaction with the said hook to retain the said handle in position when the gun is closed.

16. In an air-gun having an operating lever and an action handle pivoted to the said lever for the operation thereof, a trough-shaped metal frame for the said handle, a lock positioned therein for coaction with the gun to retain the handle in place when the gun is closed, a hand grip positioned upon the said frame and attached thereto by means comprising a bolt which also secures the said lock in position.

17. In an air-gun having a cocking lever and a loading lever; a common operating handle pivoted to the said levers comprising a trough-shaped hand grip of suitable material, a trough-shaped metal handle frame fitted therein and adapted to house the ends of the said levers when the gun is closed, and an action lock positioned within the said frame between the ends of the said levers and adapted to coact with the gun to retain the said handle in place when the gun is closed.

18. In an air-gun, having a spring and a plunger, a receiver, a plunger stop therein, an abutment for the said stop rigidly secured within the said receiver and a false barrel also rigidly secured within the said receiver out of shock transmitting contact with the said abutment.

19. In an air-gun, a receiver, a spring operated air-compression mechanism having a plunger, a stop for the said plunger positioned within the said receiver, an abutment for the said stop rigidly secured to the said receiver, and a false barrel rigidly secured to the said receiver so that there is no contact between any rearwardly facing surface of the said barrel and any forwardly facing surface of the said abutment.

20. In an air-gun, a receiver; a spring operated plunger therein; a stop for the said plunger; a false barrel rigidly attached to the said receiver and having a longitudinal slot; and an abutment for the said stop rigidly mounted in the said receiver out of shock transmitting contact with the said false barrel, comprising a sheet metal cylindrical body with a forwardly extending integral arm located in and filling the said longitudinal slot in the false barrel and an upstanding lug formed integral with the said forwardly extending arm; a depending hook rigidly attached to the said upstanding lug and extending below the said false barrel; a handle for the operation of the gun; and a lock mounted in the said handle and coacting with the said hook to retain the handle in place while the gun is closed.

21. In an air-gun, a receiver, a false-barrel rigidly secured thereto, a plug in the front end thereof, a plunger-stop located within the said receiver, a plunger-stop-abutment rigidly secured to the said receiver out of shock-transmitting contact with the said false-barrel but in position to co-act with the said plunger-stop, and a true-barrel supported at its forward end in the said plug and mounted at its rear end in the said plunger-stop.

22. In an air-gun, having a spring actuated air compression plunger; a receiver; a plunger stop therein; an abutment for the said stop rigidly secured to the said receiver; a false barrel rigidly secured to the said receiver having no shock transmitting contact with the said abutment; the said abutment having a forwardly extending arm terminating in an upturned perforated lug located within the said false barrel; and a true barrel located within the false barrel, entering the said stop and supported by the said lug.

23. In an air-gun, a receiver, a false barrel rigidly secured therein, a plug mounted in the front end of the said barrel a plunger stop mounted in the said receiver and abutting against and extending within a plunger stop abutment rigidly secured within the said receiver, and a true barrel mounted in the said plunger stop at the rear end of the barrel and in the said plug at the front end of the barrel and passing through a supporting lug formed at the forward end of said abutment.

24. In an air-gun, a false barrel, a true barrel therein, a barrel plug mounted in the false barrel and encircling the true barrel, and a sleeve mounting a front sight and interposed between the said plug and the said false barrel and secured to both of the same.

25. In an air-gun having a false barrel and a true barrel located therein; a collar positioned within the front end of the false barrel, rigidly fastened thereto and provided with an upstanding front sight passing through a slot in the false barrel; and a barrel plug having a cylindrical body encircling the true barrel, located within the said collar and extending forwardly and rearwardly beyond the collar, the said forwardly extending portion, being formed with an external annular shoulder abutting against the forward edges of the said collar and of the false barrel, and the said rearwardly extending portion of the body of the said plug being furnished with a T shaped slot of which the stem intersects the rear edge of the said plug forming two lugs which are bent outwardly to hold the said collar between the said lugs and the said shoulder.

26. In an air-gun, a receiver, a power-storage mechanism located therein, a block also located therein, a true-barrel the rear end of which enters the said block, a pellet-magazine, a rotatable pellet-carrier mounted in the said block in position to transfer pellets from the said magazine to the said barrel, and means for simultaneously rotating the pellet-carrier and operating the power-storage mechanism.

27. In an air-gun, a pellet-carrier provided with an air passage therethrough, the said pasage being enlarged at one end to form a pellet seat and a spring operated pellet-retaining plunger mounted in the said carrier and entering the said seat.

28. In an air-gun, a receiver, a block therein having a transverse counterbored hole, a rotatable pellet-carrier comprising two integral coaxial cylinders of different diameters mounted in the said counterbored hole and a spring for maintaining the shoulder between the said cylinders in contact with the corresponding shoulder in the said hole.

29. In an air-gun, a receiver, a rotatable pellet-carrier transversely mounted therein and projecting at its ends therefrom, and a forked loading-lever, the respective forked arms of which are applied to the projecting ends of the said carrier, whereby the same is held against lateral displacement with respect to the receiver and connected with the lever for rotation thereby.

30. In an air-gun, a receiver, a forked loading lever straddling the same, a rotatable pellet-carrier located in the receiver and detachably mounted in the forked end of the said lever for rotation therewith.

31. In an air-gun, a rotatable pellet-carrier mounted in the forked end of a carrier-operating lever, and having extensions through the walls of the said forked end, a groove in one of the said extensions, and a flat spring pivoted on the said lever and entering the said groove to hold the lever and the carrier detachably together.

32. In an air-gun, a rotatable pellet-carrier mounted in the forked end of a carrier-operating lever, and having extensions through the walls of the said forked end, a flat spring arm rigidly mounted on one of the said extensions and having an opening for the reception of a corresponding projection formed on the adjacent wall of the said lever and coacting therewith to cause the unitary rotation of the said carrier and lever.

33. In an air-gun, a receiver, a rotatable pellet-carrier transversely mounted therein and projecting at its ends therefrom, a forked lever for the rotation of the said carrier, a spring pivotally mounted on one of the fork-arms of the said lever and connected with the adjacent projecting end of the carrier, so as to exert a constant effort to hold the same against lateral displacement, and a spring-arm rigidly secured to the other projecting end of the carrier and detachably connected with the other fork-arm of the lever, whereby the swinging of the lever rotates the carrier.

34. In an air-gun, an air compression chamber, a spring and a plunger entering the said compression chamber, means for operating the said spring to compress and to release the same, the said plunger and the said compression chamber having matched forwardly tapering end portions.

35. In an air-gun, an air-compression chamber, a plunger and a plunger spring therein and a plunger stop closing the end of said chamber and having a frusto-conical recess for the reception of a responding plunger extension mounted upon the forward end of the said plunger.

36. In an air-gun, an air compression chamber, a plunger and a plunger spring therein, a plunger stop closing the end of the said chamber and having a frusto-conical recess for the reception of a corresponding plunger extension mounted upon the forward end of the said plunger, and a yielding buffer interposed between the said plunger and the said plunger extension.

37. In an air-gun, an air-compression chamber, a tubular-spring-actuated plunger located therein, a plunger-head mounted in the forward end of the said tubular plunger, a frusto-conical collision-member located forward of the said head and having a stem by means of which it is connected with the said head for relative longitudinal movement with respect thereto, a frusto-conical recess in the compression-chamber for the reception of the said frusto-conical collision member, and a cushioning-member interposed between the said head and collision-member.

38. In an air-gun, an air-compression chamber having a frusto-conical recess in its forward end, a spring-actuated plunger, a plunger-head located in the forward end of the plunger, a frusto-conical collision-head entering the frusto-conical recess in the compression-chamber and provided with a rearwardly extending stem by which it is connected with the said plunger-head for the longitudinal movement of the collision-member with respect to the said head, and an air-sealing and a cushioning-member interposed between the said plunger-head and cushioning-member.

39. In an air-gun, a receiver, a tubular magazine therein, a slidable tubular magazine cover on the said magazine, a loading opening in the magazine and a corresponding loading opening in the receiver.

40. In an air-gun, a receiver, a tubular magazine therein, a spring actuated magazine follower, a loading passageway through the said receiver and magazine, a slidable tubular magazine cover adapted to retract the said follower and to open the said passageway.

41. In an air-gun, a receiver having a lateral loading opening, a magazine in the receiver having a lateral opening and a sliding magazine cover interposed between the said receiver and the said magazine to permit communication between the said openings in one position and to prevent communication in another.

42. In an air-gun, a receiver, an air compression chamber therein, a tubular magazine adjacent to the said chamber and a plunger located in the said chamber and having a laterally curved integral opening lug partially surrounding the said magazine.

43. In an air-gun, a receiver; an air compression mechanism therein; trigger mechanism positioned within the receiver; a tubular magazine located within the receiver and positioned between the said air-compression mechanism and the said trigger mechanism; and means, passing around the said magazine, whereby the said trigger mechanism may coact with the said air-compression mechanism for the operation thereof.

44. In an air-gun, a receiver; an air compression mechanism therein; cocking mechanism mounted on the said receiver; a tubular magazine located within the said receiver and positioned between the said air-compression mechanism and the said cocking mechanism; and means, passing around the said magazine, whereby the said cocking mechanism may coact with the said air-compression mechanism for the operation thereof.

45. In an air-gun, a receiver, an air-compression mechanism therein; cocking and discharging mechanism mounted in the receiver; a tubular magazine located within the said receiver and positioned between the air-compression mechanism and the cocking and discharging mechanism; and means, passing around the magazine, whereby the cocking and discharging mechanism may coact with the air-compression mechanism for the operation thereof.

46. In an air-gun; a receiver comprising, integrally, a cylindrical forward portion and a trough-shaped rear portion; a barrel rigidly mounted in the said forward portion; a power storage mechanism housed partly in the said forward portion and partly in the upper section of the said rear portion; a trigger mechanism mounted in the lower section of the said rear portion; a longitudinally arranged tubular magazine substantially interposed between the said power storage mechanism and the said trigger mechanism and housed, in part, within the said rear portion of the receiver and positioned, in part, adjacent to the outside of the said forward portion of the receiver; pellet transferring means entered by the said magazine located within the said forward portion of the receiver and interposed between the said barrel and the said power storage mechanism: and means whereby the said power-storage mechanism and the said pellet-transferring means may be operated simultaneously.

47. In an air-gun; a receiver comprising integrally a cylindrical forward portion, and a trough-shaped rear portion; a barrel rigidly mounted in the said forward portion; power storage mechanism housed partly in the said forward portion and partly in the upper section of the said rear portion; trigger mechanism mounted in the lower section of the said rear portion; a longitudinally arranged tubular magazine substantially interposed between the said power storage mechanism and the said trigger mechanism and housed, in part, within the said rear portion of the receiver and positioned, in part, adjacent to and outside of the said forward portion of the receiver; pellet transferring means entered by the said magazine, located within the said forward portion of the receiver and interposed between the said barrel and the said power storage mechanism; a cocking lever whereby the said power storage mechanism may be operated; and a loading lever whereby the said pellet transferring means may be operated.

48. In an air-gun; a receiver comprising integrally, a cylindrical forward portion and a trough-shaped rear portion; a barrel rigidly mounted in the said forward portion; power storage mechanism housed partly in the said forward portion and partly in the upper section of the said rear portion; trigger mechanism mounted in the lower section of the said rear portion; a longitudinally arranged tubular magazine substantially interposed between the said power storage mechanism and the said trigger mechanism and housed, in part, within the said rear portion of the receiver and positioned, in part, adjacent to and outside of the said forward portion of the receiver; pellet transferring means entered by the said magazine, located within the said forward portion of the receiver and interposed between the said barrel and the said power storage mechanism; a cocking lever whereby the said power storage mechanism may be operated; a loading lever whereby the said pellet transferring means may be operated; and means whereby the said cocking lever and the said loading lever may be operated simultaneously.

49. In an air-gun, a receiver, a tubular magazine associated therewith, and a plunger located in the said receiver having a body and a transaxially curved operating lug extending transaxially from the said body and partly encircling the said magazine and provided with a lateral guide coacting with the said receiver to prevent the rotation of the said plunger therein.

50. In an air-gun, a receiver, a spring and a plunger located longitudinally therein, a magazine also located longitudinally in the said receiver and means for cocking the said spring and plunger, the said magazine having the said spring and plunger on its one side and the said cocking means on its other side.

51. In an air-gun, a receiver, a trough-shaped cocking lever pivoted thereto, and a tubular magazine housed partly within the said receiver and partly within the said trough-shaped lever when the latter is in its normal position.

52. In an air-gun, a receiver having a trough-shaped rear portion and a cylindrical front portion forming an air-compression chamber, a tubular magazine having its rear portion housed within the said rear portion of the receiver and its forward portion externally adjacent to the said forward portion of the receiver, and a trough-shaped lever for the operation of the gun pivoted in the said rear portion of the receiver and receiving and housing the said forward portion of the magazine within itself when closed against the said forward portion of the receiver.

53. In an air-gun, a sheet metal magazine follower link having a flat slender body provided with an eye at one end and an integral cylindrical abutment at the other end the said abutment having a laterally projecting integral operating lug.

54. In an air-gun a tubular magazine having a spring actuated follower therein, and having a longitudinal slot, a tubular sliding magazine cover mounted on the said magazine and means whereby the said cover may coact through the said slot with the said follower for the retraction thereof.

55. In an air-gun, a tubular pellet-magazine therefor, formed at its rear end with a locking-slot, a helical-spring located in the said magazine, a follower located in front of the spring for operation thereby, and a removable retaining-abutment located within the rear end of the magazine for the retention of the spring therein, the said abutment having an offsetting locking-lug entering the said slot for retaining the abutment in place in the said tubular magazine.

56. In an air-gun, a tubular pellet-magazine, a helical spring located therein, a follower located in front of the spring for operation thereby, a retaining-abutment removably mounted in the rear end of the magazine for confining the spring within the same, a tubular sliding cover for the magazine and a grip located upon the projecting rear end of the cover and having a concentric opening to permit the removal through it of the said abutment, spring and follower.

57. In an air-gun, a tubular magazine cover and a grip therefor mounted upon the rear end thereof and attached thereto by the forcing of a portion of its material into openings in the walls of the said cover.

58. In an air-gun, a receiver; a main spring therein, an abutment for the rear end of the main spring, comprising a metal box positioned in the rear end of the receiver and forming a closer therefor; and a pin mounted in the side walls of the receiver, passing through keyhole slots in the walls of the abutment and provided with grooves for the reception of the edges of the narrower portions of the said keyhole slots, whereby the receiver, abutment and pin are held together.

59. In an air-gun, a receiver, a main spring and tubular magazine located in the said receiver, and an abutment for the said spring removably mounted in the said receiver and supporting the said magazine.

60. In an air-gun, a receiver; a main spring; an abutment therefor, a plunger and a plunger stop located in the said receiver; and a tubular magazine whose front end enters the said stop and whose rear end is supported by the said abutment.

61. In an air-gun, a receiver, a main spring therein, an abutment for the said spring removably mounted in the said receiver, a tubular magazine and a tubular sliding cover therefor passing through the said abutment and supported thereby.

62. In an air-gun, a receiver, a main spring therein, an abutment for the said spring removably mounted in the said receiver, a tubular magazine and a tubular sliding cover therefor passing through the said abutment and a spring operated magazine cover-lock mounted on the said abutment.

63. In an air-gun having a receiver, a main-spring therein, an abutment for the said spring mounted in the said receiver, a tubular magazine located in the said receiver, a sliding magazine cover passing through the said abutment, and a lock mounted on the said abutment for the said cover.

64. In an air-gun having a tubular magazine and a cover sliding longitudinally thereon and having a transverse locking slot therein, a laterally movable spring operated lock adapted to engage with the said slot to hold the said cover in its closed position.

65. In an air-gun having a tubular magazine and a cover sliding longitudinally thereon and having a transverse locking slot and a detent aperture therein, a laterally movable spring operated lock adapted to engage with the said slot and with the said detent aperture to hold the said cover in its closed and retracted positions respectively 66. In an air-gun, a receiver, a main spring therein, an abutment for the said spring detachably mounted in the said receiver, a tubular magazine and a sliding cover therefore located in the said receiver and passing through the said abutment, a magazine cover lock mounted in the said abutment and adapted to lock the said cover positively in one position of the said cover and yieldingly in another.

67. In an air-gun, a receiver, a tubular magazine and a sliding magazine cover in the said receiver, a lock comprising a flat plate pivotally mounted within the receiver and having an aperture through which the said cover passes for coaction therewith by means of a notch in the said cover, and a spring for the operation of the said plate.

68. In an air-gun, a sear having two parallel walls, a trigger located between the said walls and a spring interposed between and coacting with the sear and with the trigger for the mutual operation thereof.

69. In an air-gun, a stock having a tenon at its forward end, a trough-shaped sear guide embracing the said tenon and a trough-shaped tang, having a trigger mounted therein, and embracing the said sear guide.

70. In an air-gun, a hollow stock tang telescopically receiving a trough-shaped sear guide, a pin mounted in the said tang and having two annular slots for the reception of the edges of the narrower portions of keyhole slots in the side walls of the sear guide to retain the said pin in place, and a trigger mounted on the said pin.

71. In an air gun, a stock having a tenon at the front end thereof, a trough-shaped sear guide receiving the said tenon, a stock tang embracing the said sear guide, means for fastening the said parts together, two pins mounted in the said tang each having a pair of annular grooves for the reception of the narrower portions of keyhole slots in the side walls of the said sear-guide, whereby the said pins are held in place, and a trigger and a sear mounted upon the said pins respectively.

72. In an air-gun, a stock having a tenon at the front end thereof, a trough-shaped sear guide receiving the said tenon, a stock tang embracing the said sear guide, means for fastening the said parts together, two pins mounted in the said tang each having a pair of annular grooves for the reception of the narrower portions of keyhole slots in the side walls of the said sear guide, whereby the said pins are held in place, and a trigger and a sear mounted upon the said pins respectively and a common operating spring interposed between the said trigger and sear.

73. In an air-gun, a receiver, provided with a transverse pin, a stock provided with a stock tang and a take-down screw, the said tang being embraced by the said receiver, the said pin being engaged by the forward end of the said tang and the said screw entering the said receiver to hold the parts of the gun together.

74. In an air-gun, a receiver having a trough-shaped rear portion, a stock, a trough-shaped stock tang carried thereby, and entered into the said rear portion of the receiver, a trough-shaped sear-guide mounted within the said tang, a trough-shaped sear mounted within the said guide and a trigger mounted within the said sear.

75. In an air-gun, a cocking lever, a longitudinally slidable safety lock, trigger mechanism, a spring pressing the said lock into engagement with the said trigger mechanism to prevent the operation thereof and means whereby the said cocking lever in its closed position holds the said safety lock against the tension of the said spring out of engagement with the said trigger mechanism whereby the operation of the latter is permitted only when the gun is closed.

76. In an air-gun, a receiver, a cocking lever pivoted thereto, a longitudinally slidable safety lock within the said receiver, a spring, means whereby the said spring will press the said sliding lock to a position at one of the limits of its excursion while the gun is being opened and whereby the said lock is forced against the tension of the said spring to a position at the other limit of its excursion when the gun is closed, and means whereby the said lock will prevent the gun from being discharged unless the same is closed.

77. In an air-gun, a receiver, a trigger mechanism therein and a sliding safety lock within the said receiver comprising substantially parallel vertical walls connected by an integral transverse horizontal plate the rear edge of the said plate extending rearwardly beyond the said walls and being turned up to form a shoulder for coaction with the said trigger mechanism.

78. In an air-gun, a receiver having a trough-shaped rear portion, a safety lock housed therein comprising two substantially parallel vertical walls adjacent and parallel to the walls of the receiver, a trough-shaped cocking lever whose rear end is housed between the walls of the said safety lock, a trough-shaped cocking pawl and a tubular magazine receiver between the side walls of the said cocking lever, when the gun is closed.

79. In an air-gun, a receiver having a trough-shaped rear portion, a trough-shaped cocking lever partially housed and pivotally mounted therein upon a transverse pin mounted in the side walls of the said receiver and a safety lock comprising parallel walls interposed between the walls of the said receiver and the walls of the said cocking lever respectively and supported by the said pin.

80. In an air-gun, a receiver; a lever; and a pivot, whereby the lever is mounted on the receiver; the said pivot comprising a stem, having one end threaded to enter a nut and having at the other end an enlarged head mounted in the receiver and bearing a central extension; a nut having an internally threaded sleeve, screwed upon the said threaded stem end, and a rim furnishing a bearing shoulder for the receiver wall; and a sheet metal head having a central polygonal perforation to receive the said extension on the said stem head, the said extension being riveted down to fill the said polygonal hole and thereby hold the said sheet metal head in place and against rotation, the said sheet metal head having an inwardly bent peripheral lug which enters a corresponding recess in the adjacent wall of the receiver.

In testimony whereof we have signed this specification in the presence of two subscribing witnesses.

FRANK F. BURTON.
THOMAS D. JOECK.

Witnesses:
ERIK S. PALMER,
A. E. HODGSON.